A. P. ALLEN.
Roller and Harrow.

No. 167,490.

Patented Sept. 7, 1875.

UNITED STATES PATENT OFFICE.

ALMERRIN P. ALLEN, OF DENMARK, IOWA.

IMPROVEMENT IN ROLLERS AND HARROWS.

Specification forming part of Letters Patent No. 167,490, dated September 7, 1875; application filed August 31, 1874.

*To all whom it may concern:*

Be it known that I, ALMERRIN P. ALLEN, of Denmark, in the county of Lee and State Iowa, have invented a new and Improved Plow Attachment; and I do hereby declare that the following is a full, clear, and exact description of the same, reference being had to the accompanying drawing, forming a part of this specification, in which—

Figure 1:
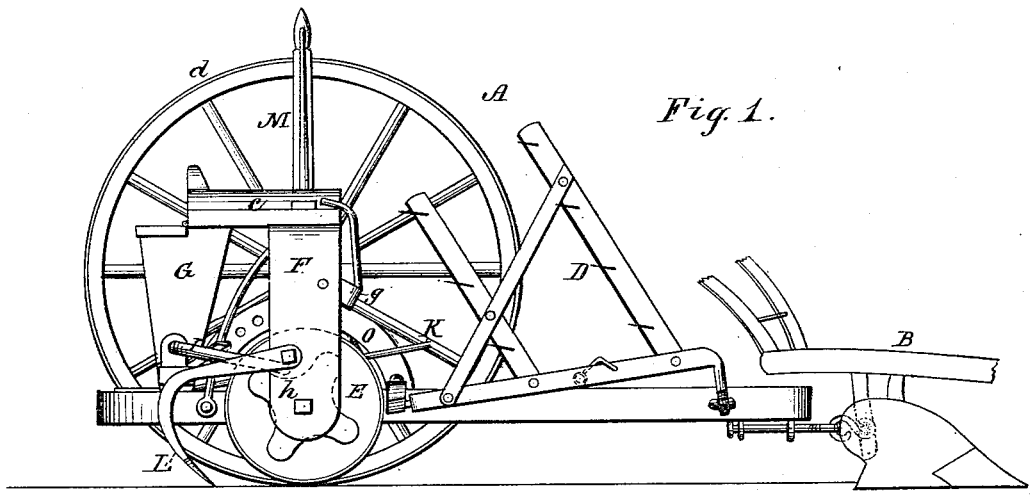
Figure 2:
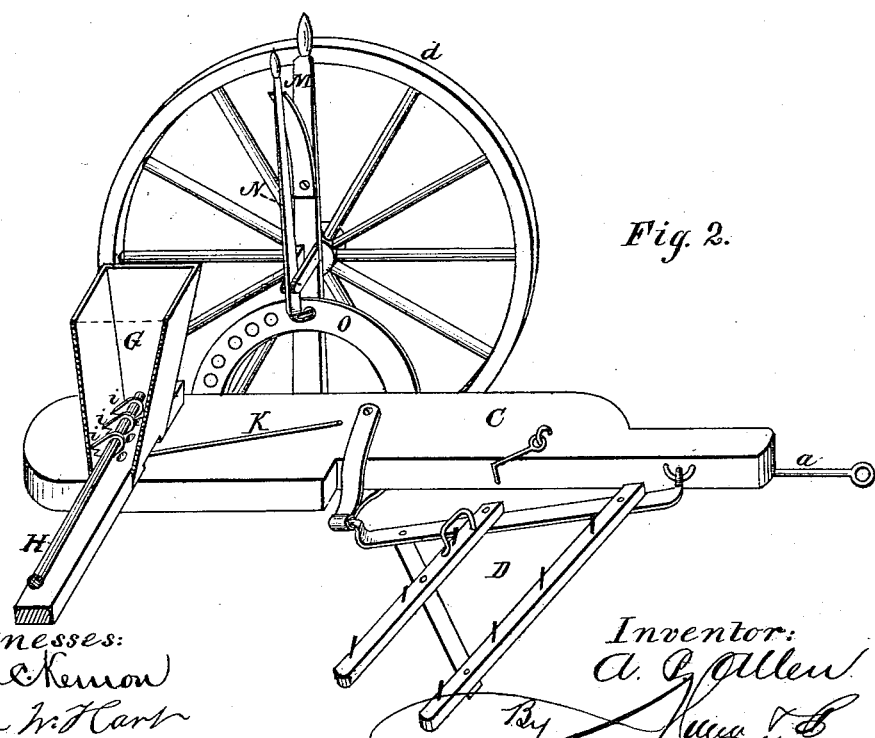

Figure 1 is a side elevation of my improved machine, and Fig. 2 a partly sectional perspective view, certain parts being removed.

The invention is an improvement in side-draft machines, designed for attachment to and use with plows.

The improvement relates to the construction and arrangement of parts hereinafter described and claimed.

Referring to the drawing, the side-draft machine A is attached to the turning-plow B by means of a swiveled rod, $a$, whereby they have independent oscillation, and the plow may be manipulated or guided in the ordinary way by the operator from his seat $c$. To secure the requisite side draft, the machine B is supported at the left side of beam C by a wheel, $d$, and a harrow, D, and roller E are attached to the other side. The wheel moves with less friction than the harrow or roller, hence the tendency is to push or draw the plow A toward the right. This tendency varies, of course, with the size and weight of the harrow and roller, and is theoretically nearly equivalent to the power which would be otherwise absorbed in friction between the landside of the plow and the vertical wall or landside of the furrow. In other words, the harrow and roller constantly tend to push or throw the rear end of the plow to the right with nearly the same force as the furrow-slice, while passing over the mold-board, crowds the plow to the left—*i. e.*, toward the land. The two opposing forces will be in equilibrium when the size and weight of the harrow and roller bear a certain definite relation to the size and weight of the plow. What that precise relation is can be ascertained only by experiment. It is sufficient to state that for practical purposes the parts may be made of the ordinary or average size, as when used separately. The harrow E is hinged to the side of beam C, and, when raised to a vertical position, is held by a hook. The roller, which is of the ordinary construction, is journaled in suitable bearings in the vertical frame F, attached to beam C, and follows directly in rear of the roller. A four-armed cam, $k$, is attached to the outer end of the roller, and rotates with it. The function of the cam is to impart an oscillating movement to the seed-agitating fingers $i$ within the corn-hopper G, Fig. 2, said fingers being attached to a rod or shaft, H, whose bent end or arm I, Fig. 1, rests on the cam and follows its sinuosities. A pivoted scraper, $g$, Fig. 1, is arranged above the roller, Fig. 1. A pivoted lever K, Fig. 2, serves to operate a slide, not shown, by which the discharge of corn may be wholly or partially cut off. The seed is dropped in the furrow and covered by the next furrow-slide. A marking-plow, L, Fig. 1, is pivoted to the side of the vertical frame. When not required for use, it may be turned up into a vertical position. The short axle of the transporting-wheel $d$ projects from the gage-lever M, Fig. 2, which is pivoted at its lower end to the side of beam C. The adjustment of the gage-lever backward has the effect of raising the inner end of the roller E. Thus, the latter may be adjusted to a horizontal position, whatever be the depth to which the plow is set to run. The means of locking the gage-lever M in any adjustment is a spring-lever, N, whose nose enters the holes in the arc-bar O, attached rigidly to beam C. The mode of operating the levers M N is obvious.

What I claim is—

1. The combination of the spring pawl N, lever M, carrying-axle of wheel $d$, the curved perforated bar O rigidly attached to the frame C, and the roller and plow, as shown and described, whereby the roller may be adjusted relative to said wheel, corresponding to the depth of furrow, as set forth.

2. The improved cultivating and seed-dropping attachment for plows, formed by the combination of the seed-hopper, the harrow, and the roller, said parts being arranged as shown and described, to operate as specified.

ALMERRIN P. ALLEN.

Witnesses:
C. W. FOX,
J. F. KINSLEY.